UNITED STATES PATENT OFFICE.

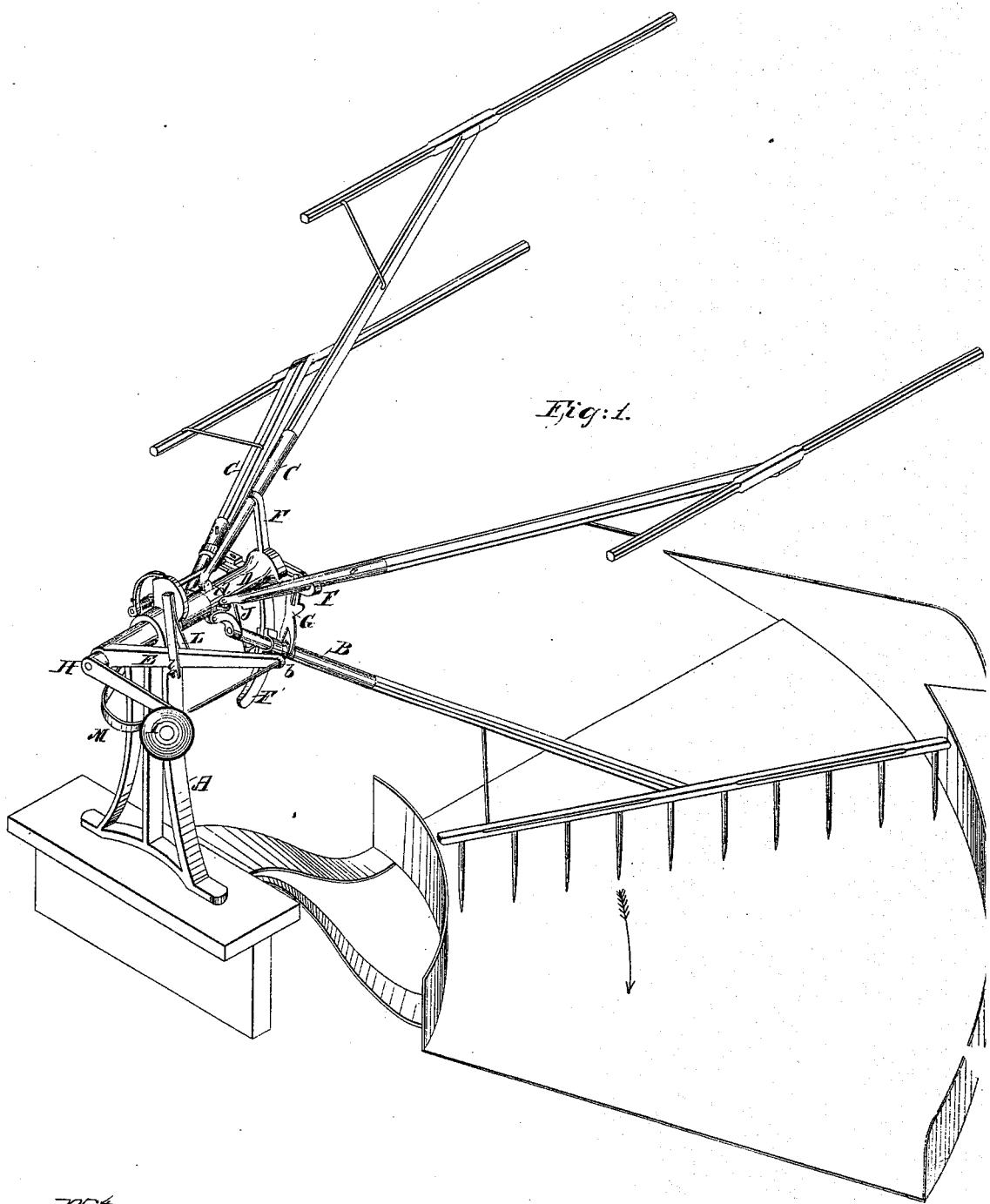

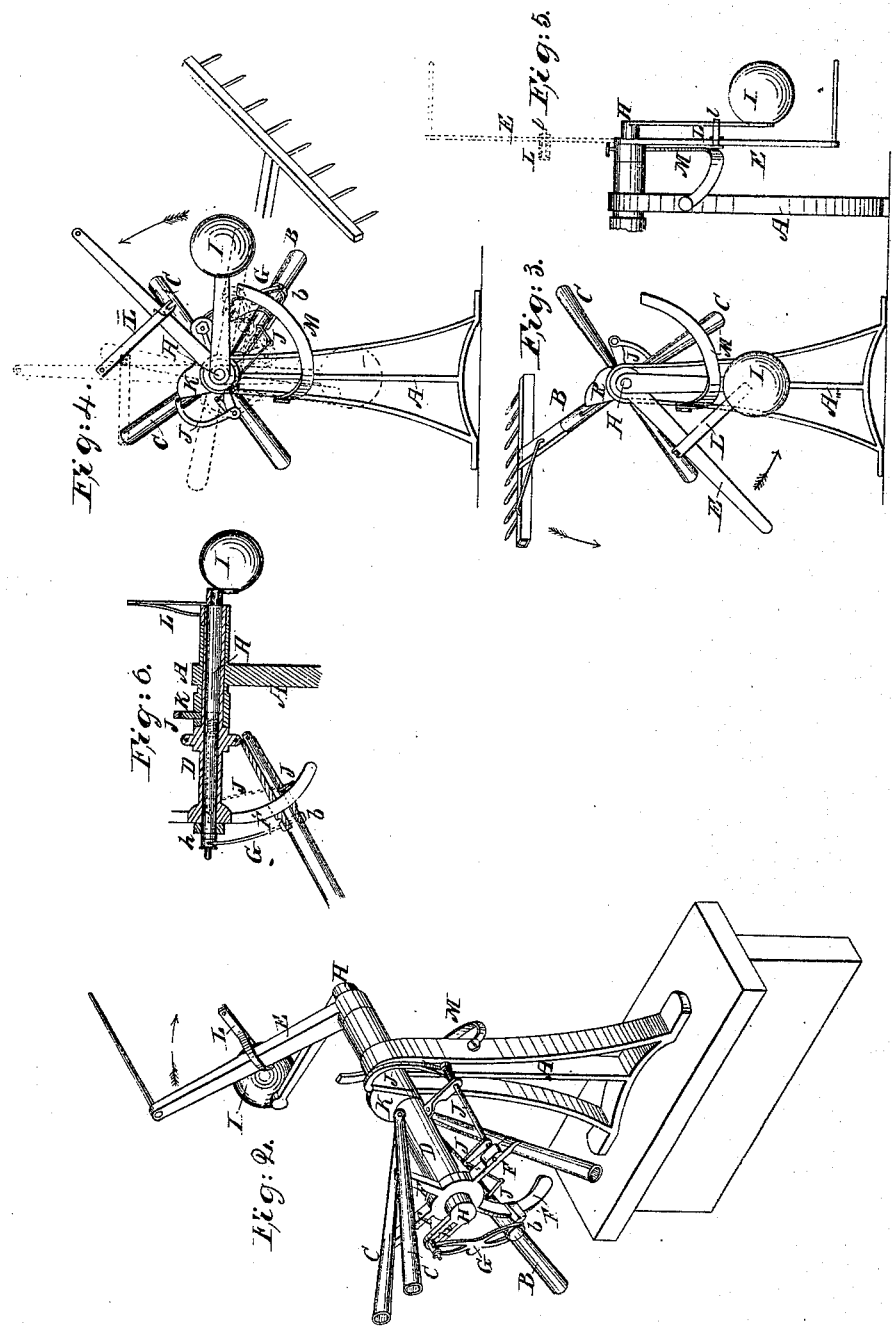

H. A. M. HARRIS, OF PHILADELPHIA, PENNSYLVANIA.

IMPROVEMENT IN HARVESTER-RAKES.

Specification forming part of Letters Patent No. 72,199, dated December 17, 1867.

*To all whom it may concern:*

Be it known that I, H. A. M. HARRIS, of the city and county of Philadelphia, in the State of Pennsylvania, have invented certain new and useful Improvements in Harvester-Rakes, of which the following is a full, clear, and exact description, reference being had to the accompanying drawings, which make part of this specification, and in which—

Figure 1 represents a view in perspective of so much of a harvester to which my improvements are applied as is necessary to illustrate my invention, as seen from the stubble side of the machine. Fig. 2 represents a similar view of a portion of the same, as seen from the divider side of the machine. Fig. 3 is a view in elevation of the rake, as seen from the gearing side, with its parts in the attitude they assume when the rake is moving forward to enter the standing grain. Fig. 4 is a similar view of the same, the red and blue lines showing different positions of the rake. Fig. 5 represents a view in elevation of a portion of the rake, as seen from the front, illustrating the mode of latching and unlatching the rake; and Fig. 6 is a vertical central section through the axis of the rake.

My invention relates to that class of automatic rakes for harvesters in which a series of combined reel and rake arms, continuously rotating around a common center, are caused successively to enter the standing grain, and press it back upon the cutters, and, when severed, to sweep it back upon the platform, whence it is discharged when the rake comes round.

The improvements herein claimed consist, first, in a novel combination of devices for lifting the rake suddenly at the end of its stroke, to avoid dragging the grain, and to diminish the power required to carry it round to enter the standing grain; second, in a novel device for automatically throwing the rake into and out of gear; third, in a novel device for holding the rake-teeth rigidly down upon the platform when raking off, and for automatically turning up the teeth after discharging the gavel.

In the accompanying drawings, which exemplify one convenient mode of carrying out the objects of my invention, the rake is shown as supported upon a post or frame, A, which may be mounted upon the main frame, the platform, or the heel of the finger-beam, to adapt it to machines having either rigid or hinged finger-beams or platforms. The rake-arm B and beater-arms C are mounted, in this instance, on a tubular axle, D, turned by a crank, E, or other suitable driving-gear.

The rake-arm is pivoted to a lug, $d$, Figs. 1 and 6, on the axle, so as to swing radially toward or from it, being prevented from yielding laterally by a radial guide, F′, on the axle D. The beater-arms are rigidly held by braces F.

The rake-arm B is connected, by a gimbal-joint, $b$, to a link, G, in like manner connected to a crank, $h$, on a crank-shaft, H, which revolves inside the axle D, and is provided at its outer end with a crank and counter-balance, I.

The rake-arm is so pivoted as to swing radially with respect to its center of motion, and also to turn axially in its bearings, as shown in Fig. 1, and is turned at the proper moment by a compound lever, J, mounted on and turning with axle D. The end of this lever slides over a stationary cam, K, fixed upon frame A.

A spiral spring, $j$, on the lever causes it and the rake to turn quickly when the lever escapes from the cam.

A spring-catch, L, mounted on the crank E, is, at the proper moment, thrown into contact with the weighted arm I, to move the rake, by means of a guide, M, fixed upon the frame, which presses it in until its tongue $l$ strikes the weighted lever and lifts it, as hereinafter described.

The operation of the rake is as follows: As the machine advances through the field, rotary motion is communicated to rake-shaft D from the driving-gear in any proper and well-known way, and the parts revolve in the direction indicated by the arrows in the drawings. The beater-arms, as they successively come round to the front, drop into the standing grain in advance of the cutters, and press it back to be severed; and their continued backward movement sweeps the cut grain back upon the platform, leaving it there until the rake comes round to sweep it off.

In Fig. 3 the rake is shown as descending into the standing grain prior to commencing its backward movement to discharge the gavel. At this moment, it will be seen, the crank E is in front of the counter-balance I, which hangs vertically, the lever J just beginning to bear lightly on the back of the cam K. As the crank E passes back into a vertical position, as shown in Fig. 5, the spring-latch L strikes the guide M, and is protruded until its tongue l strikes the weighted lever or counter-balance I, which it carries along with it. The rake now begins to pass over the platform. After lifting the weighted lever I into a horizontal position, (see Figs. 1 and 4,) the latch L escapes from the guide M, and releases the counter-balance, which holds the rake-teeth firmly down upon the platform while raking off. At the same time the lever J passes over the cam K, which is so shaped as to turn the rake, axially, downward and forward, as it moves backward, thus keeping the teeth perpendicular and the rake-head in a line radial with its center of motion, by which means one end of the rake is prevented from dropping off the platform before the other, and thus discharging the grain irregularly. By the time the crank E assumes the vertical attitude (shown in red in Figs. 4 and 5) the rake has discharged the gavel. At the moment of discharge the lever J drops from the cam; the counter-balance is also simultaneously released, and drops into a perpendicular position, (shown in red in Fig. 4;) the link G flexes suddenly downward; the rake is lifted quickly and turns on its axis; its teeth are turned up, and the rake-arm quickly drawn inward toward its center of motion, thus diminishing its leverage as it goes forward to repeat its stroke. As the rake moves forward, its teeth are turned down by the lever J, and the rake is thrown outward by the combined action of the link G and lever J into the proper position to re-enter the grain, and the above-described operation is repeated.

It is obvious that the details of construction of my invention might be varied in various ways without departing from the spirit of my invention. For instance, a gear-wheel might be substituted for the crank E, and the latch L might pass through a hole in the face of the wheel. The counterbalance-lever might also be shortened and its form varied to adapt it to the varying conditions under which it is required to operate.

It is evident that my improved rake and reel may readily be adapted to any harvester using an ordinary reel; and that as the rake is supported at the inner end only, no side draft is created by its weight bearing on the divider end of the machine.

I have shown the rake as revolving on a horizontal axis; but my improvements obviously might be adapted to rakes having inclined axes.

What I claim herein as my invention, and desire to secure by Letters Patent, is—

1. The combination, substantially as described, of a rake rotating on a tubular axis with a crank-shaft, link, and counter-balance to hold the rake down when raking off, to lift it quickly at the end of its backward movement, and to draw it inward when passing forward.

2. The combination, substantially in the manner described, of a continuously-revolving rake with a counter-balance and latching and unlatching device.

3. The combination, substantially as described, of a continuously-revolving rake having a pivotal movement in its support with a cam and compound lever, for the purposes both of turning the rake axially and of holding it in a line radial with its axis while raking off, as set forth.

In testimony whereof I have hereunto subscribed my name.

H. A. M. HARRIS.

Witnesses:
WM. B. DAYTON,
W. OGLE.